(12) United States Patent
Revnell

(10) Patent No.: US 7,062,859 B1
(45) Date of Patent: Jun. 20, 2006

(54) MEASURING AND LAYOUT DEVICE

(76) Inventor: Joseph D. Revnell, 16706 Bowers Rd., Interlochen, MI (US) 49643

( * ) Notice: Subject to any disclaimer, the term of this patent is extended or adjusted under 35 U.S.C. 154(b) by 0 days.

(21) Appl. No.: 09/505,119

(22) Filed: Feb. 16, 2000

(51) Int. Cl.
*B43L 13/00* (2006.01)
*G01B 3/10* (2006.01)

(52) U.S. Cl. .......................... 33/32.1; 33/757; 33/761; 33/770; 33/430

(58) Field of Classification Search ............ 33/32.1, 33/32.3, 484, 760, 768, 485, 770, 16, 483, 33/430, 495–500, 755, 757–761, 769, 27.01, 33/27.02, 27.03, 27.032, 27.04, 27.07, 41.1, 33/42, 121, 668, 27.031
See application file for complete search history.

(56) References Cited

U.S. PATENT DOCUMENTS

| | | | | |
|---|---|---|---|---|
| 577,472 A | | 2/1897 | White | |
| 2,349,670 A | * | 5/1944 | Moxley | 33/27.03 |
| 3,269,015 A | * | 8/1966 | Barker | 33/27.08 |
| 3,763,569 A | * | 10/1973 | Merlat | 33/138 |
| 3,774,308 A | | 11/1973 | Jurentkuff | 33/75 |
| 4,155,174 A | | 5/1979 | Watson | 33/176 |
| 4,181,959 A | * | 1/1980 | Tateishi | 33/138 |
| 4,181,960 A | * | 1/1980 | Tateishi et al. | 33/138 |
| 4,195,348 A | * | 3/1980 | Kakutani | 33/140 |
| 4,227,314 A | | 10/1980 | Schliep | 33/480 |
| 4,344,231 A | | 8/1982 | Martinez | 33/1 |
| 4,455,748 A | | 6/1984 | Rick | 33/1 |
| 4,835,870 A | * | 6/1989 | Rauch et al. | 33/1 C |
| 4,882,850 A | * | 11/1989 | Lindsey | 33/760 |
| 5,253,421 A | * | 10/1993 | Landmark | 33/760 |
| 5,481,810 A | | 1/1996 | Hastings et al. | 33/484 |
| 5,755,072 A | * | 5/1998 | Lingafelter | 52/741.1 |
| 5,768,797 A | * | 6/1998 | Trevino | 33/761 |
| 5,914,785 A | | 6/1999 | Allison et al. | |
| 6,115,931 A | * | 9/2000 | Arcand | 33/668 |
| 6,314,334 B1 | * | 11/2001 | Berlin et al. | 700/134 |

FOREIGN PATENT DOCUMENTS

FR 002614982 A1 * 11/1988 .................. 33/763

* cited by examiner

*Primary Examiner*—Diego Gutierrez
*Assistant Examiner*—Mirellys Jagan
(74) *Attorney, Agent, or Firm*—Price, Heneveld, Cooper, DeWitt & Litton, LLP

(57) ABSTRACT

A measuring and layout device having a stationary member having a flat surface adapted to be marked on and an angle and distance device rotatably coupled to the stationary member. The angle and distance device includes a longitudinally and laterally rigid extendable tape that can be extended from a central point and that has an edge that facilitates reliably marking on the stationary member to form an accurate template as the angle and distance device is rotated and the tape is extended and retracted to critical features of an area.

54 Claims, 13 Drawing Sheets

MEASURING AND LAYOUT DEVICE

BACKGROUND OF THE INVENTION

The present invention relates to measuring instruments, and in particular to a measuring and layout device.

Measuring instruments are used to measure the configuration of areas in order to be able to produce a sheet item with the same dimensions as the areas. In the flooring industry, measuring instruments are used to measure the floor space of a room in order to be able to cut the carpet, vinyl, etc. to accurately fit the room. In the counter business, measuring instruments are used to measure the configuration of a counter in order to be able to cut a counter top to accurately fit the counter.

Heretofore, the measuring instruments and methods for measuring have included the use of paper patterns and the methods of square and measure, approximation, or cut in place. When a paper pattern is used to measure the dimensions of an area, a large sheet of paper is placed over the area, and the paper is cut to have the same dimensions as the area. The paper patterns, however, can only be used once for each measurement. Moreover, if the area is very large, a sizeable amount of paper can be used for each project adding up to a waste of resources over a period of time. The method of square and measure employs a carpenter square to measure the size of rectangles making up a polygonal room. The measurements of the rectangles are then reproduced on a sheet good and the sheet good is cut to the shape of the rectangles. The method of square and measure, however, only allows for measurements of areas made up of a plurality of rectangles. The method of approximation comprises approximating the size and shape of the area and the cutting the sheet good to that approximation. The sheet goods are then placed over the area and cut to fit the proper proportions. This method can be very time consuming and wasteful. The method of cut in place comprises placing the sheet good over the area and then cutting the sheet good to fit the area. This method can also be very time consuming. Furthermore, the transportation of a large sheet good that has not been cut to proportion can be very expensive. Likewise, the method can be very wasteful because the remaining area of the sheet good has to be returned to the warehouse or other storage facility for the sheet good.

Accordingly, an apparatus solving the aforementioned disadvantages and having the aforementioned advantages is desired.

SUMMARY OF THE INVENTION

One aspect of the present invention is to provide a measuring and layout device having a stationary member having a flat surface adapted to be marked on and an angle and distance device rotatably coupled to the stationary member. The angle and distance device includes a longitudinally and laterally rigid extendable tape that can be extended from a central point and that has an edge that facilitates reliably marking on the stationary member to form an accurate template as the angle and distance device is rotated and the tape is extended and retracted to critical features of an area.

Another aspect of the present invention is to provide a method of accurately cutting sheet goods including the steps of providing a template including a center point and feature location comprising angle and distance information relative to the center point, providing a sheet of material to be cut, placing the template on the sheet of material, providing an angle and distance device adapted to identify critical points on the sheet of material based on the feature location information, and cutting the sheet of material according to the critical points.

The principal objects of the present invention include providing a measuring and layout device that can be used for measuring a wide variety of patterns. The measuring and layout device provides simple construction and is compact in size. The measuring and layout device can be quickly and easily used for accurate measurements. The measuring and layout device also provides easy measurements for complex shapes. The measuring and layout device is efficient in use, economical to manufacture, capable of a long operable life, and particularly adapted for the proposed use.

These and other features, advantages, and objects of the present invention will be further understood and appreciated by those skilled in the art by reference to the following specification, claims and appended drawings.

DETAILED DESCRIPTION OF THE PREFERRED EMBODIMENTS

Figure 1:
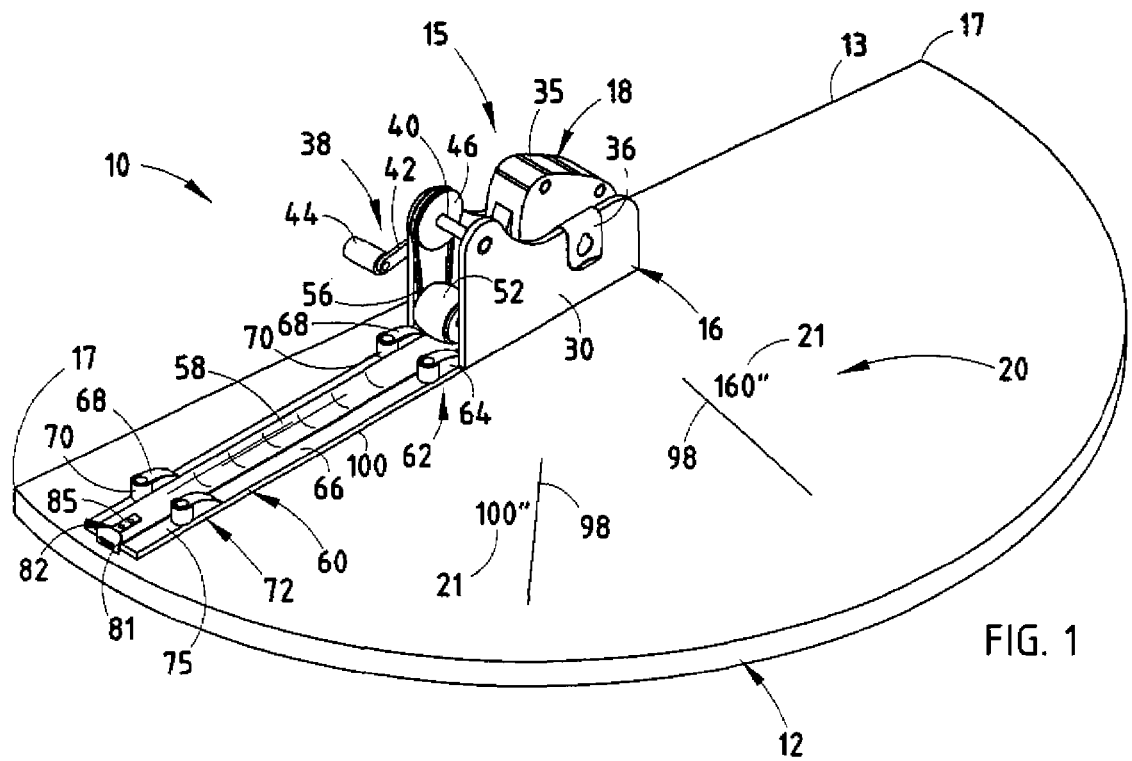
FIG. 1 is a perspective view of the measuring and layout device of the present invention.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The reference number 10 (FIGS. 1 and 2) generally designates a measuring and layout device embodying the present invention. The measuring and layout device 10 includes a stationary member 12 and an angle and distance device 15 rotatably connected to the stationary member 12. The angle and distance device 15 includes a longitudinally rigid and laterally rigid extendable tape 58 that facilitates reliably marking on the stationary member 12 to form an accurate template 20 as the angle and distance device 15 is rotated and the tape 58 is extended and retracted to critical features 88 of an area 22. As described in more detail below, the template 20 is used to record dimensions 21 of the area 22 and to mark the dimensions 21 on a sheet good 24 (FIG. 6), such as floor covering (e.g. vinyl), wall covering (e.g. paneling), or the like.

The illustrated stationary member 12 is a board or a thin panel. The stationary member 12 preferably has a substantially semi-circular configuration (FIG. 1) with a straight edge 13 between two circumferential ends 17 of the semi-circle. The straight edge 13 is preferably slightly shorter than the diameter of the semi-circle. It is contemplated that the stationary member 12 could have any shape depending on the area to be measured. For example, the stationary member 12 can have a circular (FIG. 5), square or rectangular configuration. The stationary member 12 includes a top surface 26 that can be erasably marked on. Alternatively, a sheet of paper can be attached to the surface 26 to be marked on. The illustrated stationary member 12 has non-slip feet 14 attached to a bottom surface 24 of the stationary member 12. Notably, these non-slip feet 14 are not needed in many applications. Where needed, the non-slip feet 14 are made of a friction-generating material that will prevent movement of the measuring and layout device 10 once the measuring and layout device 10 is placed into position. When the surface to be measured can be scratched or where it has a tendency to be slippery, preferably, the non-slip feet 14 are suction cups made of non-marring material although pointed feet, rubber feet, or the like can also be used. The angle and distance device 15 is pivotally mounted to the top surface 26 of the stationary member 12 at the axis of the stationary member 12. Preferably, the angle and distance device 15 is pivotally connected to the stationary member 12 by a snap fastener 28 that allows the angle and distance device 15 to be removed from the stationary member 12. The snap fastener 28 also allows the angle and distance device 15 to rotate 360 degrees relative to the stationary member 12. Therefore, the angle and distance device 15 can be removed from a first stationary member and then attached to a second stationary member. The snap fastener 28 therefore allows the angle and distance device 15 to be used with several different stationary members 12. It is contemplated that a rivet could connect the angle and distance device 15 to the stationary member 12, thereby securely connecting the angle and distance device 15 to the stationary member 12.

Figure 2:
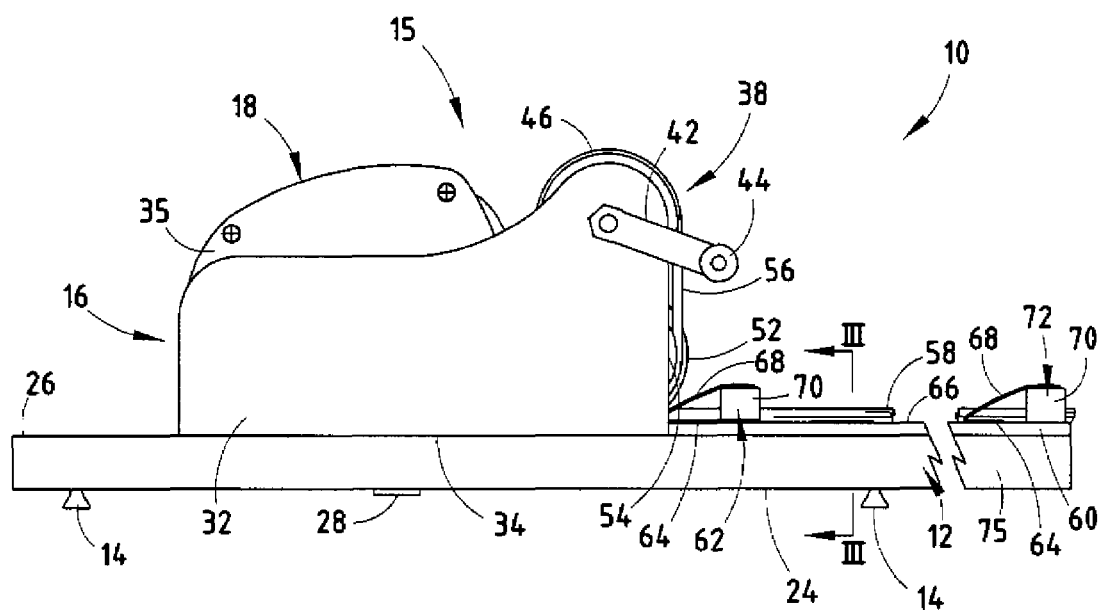
FIG. 2 is a side view of the measuring and layout device of the present invention.
Figures 3, 4:
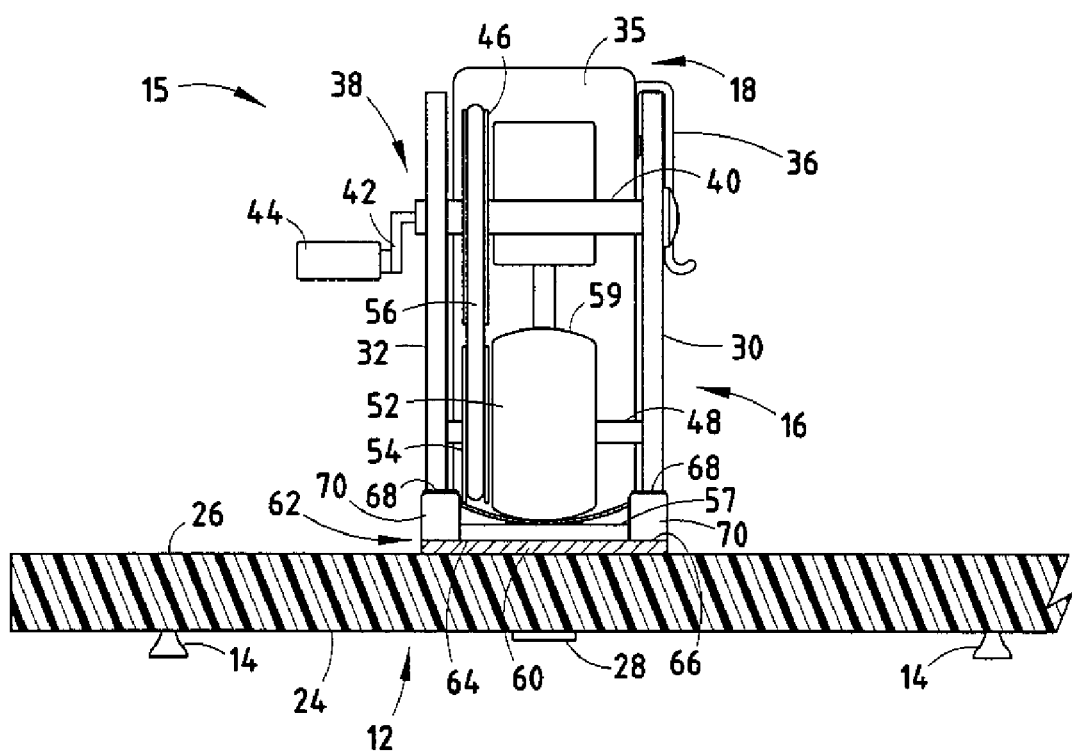
FIG. 3 is a front view of the measuring and layout device of the present invention taken along the line 3—3 in FIG. 2.
FIG. 4 is an isometric exploded side view of the holder and tape of the present invention.

As seen in FIGS. 1–3, the illustrated angle and distance device 15 includes a carrier 16 and a tape measure 18. The carrier preferably has a U-shaped cross-section with a first side wall 30, a second side wall 32 and a bottom wall 34 that connects the first side wall 30 and the second side wall 32. The snap fastener 28 is attached to the bottom wall 34 of the carrier 16, thereby connecting the carrier 16 to the stationary member 12. The illustrated tape measure 18 has a housing 35 that is removably operably supported on the carrier 16 between the first side wall 30 and the second side wall 32 above the bottom wall 34. The tape measure 18 is a commercially available tape measure of the type that has a spring-biased rewind, and has a belt clip 36 on one side. Preferably, the tape measure 18 is removably secured to the carrier 16 by inserting the first side wall 30 into the clip 36 attached to the housing 35. In an alternative embodiment, the housing 35 and the carrier 16 are integral. In the alternative embodiment, the tape measure 18 includes a replaceable tape 18 that is operably supported on the carrier 16 within the integral housing 35 and carrier 16.

In the illustrated example, the carrier 16 includes a tape measure extender 38. The tape measure extender 38 allows a single person to create the template 20 for the measurement and layout device 10. The tape measure extender 38 includes a top cross bar 40 that extends between and is pivotally attached to a front top portion of the first side wall 30 and the second side wall 32. The cross bar 40 can freely rotate relative to the carrier 16. A crank arm 42 located outside of the second side wall 32 extends transversely to and is operably connected to the cross bar 40. It is contemplated that the crank arm 42 could be located outside of the first side wall 30 and connected to the cross bar 40. A handle 44 is transversely attached to the crank arm 42 whereby the top cross bar 40 can be rotated by moving the handle 44 in a circle around the axis of rotation of the top cross bar 40. The crank arm 42 can rotate relative to the handle 44, thereby allowing rotation of the crank arm 42 without rotating the handle 44 relative to the carrier 16. A first pulley wheel 46 is attached to the top cross bar 40 adjacent to a top inside front portion of the second side wall 32. The tape measure extender 38 also includes a middle cross bar 48 that extends between and is attached to a front middle portion of the first side wall 30 and the second side wall 32. The middle cross bar 48 is located generally below the top cross bar 40. A tape roller 52 is located in the center of the middle cross bar 48 and has an integral second pulley wheel 54 adjacent the second side wall 32. The first pulley wheel 46 and the second pulley wheel 54 are aligned vertically and joined by a drive belt 56. Therefore, when the handle 44 of the crank arm 42 is moved in a circle around the axis of rotation of the top cross bar 40, the top cross bar 40 and the first pulley wheel 46 will rotate and thereby operate the drive belt 56. Consequentially, the second pulley wheel 54 and the tape roller 52 will rotate via the movement of the drive belt 56. A bottom cross bar 57 extends between and is attached to the front bottom portion of the first side wall 30 and the second side wall 32 generally below the middle cross bar 48. The bottom cross bar 57 can rotate freely relative to the carrier 16. The illustrated tape roller 52 has a convex outer circumferential surface 59 and the apex of the convex outer surface comes into contact with the bottom cross bar 57 when the tape measure 18 is not placed within the carrier 16. Therefore, the tape roller 52 and the bottom cross bar 57 will rotate in opposite directions when the handle 44 is rotated around the axis of rotation of the top cross bar 40.

The illustrated tape measure 18 includes tape 58 that is frictionally held between the tape roller 52 and the bottom cross bar 57 of the carrier 16. The tape 58 has an upper concave surface with approximately the same radius of curvature as the convex outer circumferential surface 59 of the tape roller 52. As a consequence of the tape roller 52 and the bottom cross bar 57 rotating in opposite directions, the tape 58 held between the tape roller 52 and the bottom cross bar 57 will extend from the carrier 16 when the tape roller 52 is rotated in the counter clockwise direction. Therefore, rotation of the handle 44 in the counter clockwise direction around the axis of rotation of the top cross bar 40 of the tape measure extender 38 will cause the tape 58 to mechanically extend outwardly from the carrier 16, thereby allowing a single person to extend the tape 58 from the carrier 16 without leaving the locality of the carrier 16. In the illustrated embodiment, the tape 58 extends from a housing 35 placed into the carrier 16. Alternatively, the carrier 16 and the housing 35 can be integral and the tape 58 can be inserted into the integral housing 35 and carrier 16. Likewise, in an alternative embodiment, the tape 58 can be integral with the housing 35 and the carrier 16. Furthermore, the tape measure 18 preferably has a digital readout on the top of the tape measure 18 for accurately giving the distance that the tape 58 is extended from the tape measure 18.

The illustrated carrier 16 also includes a front leg 60 extending parallel to the stationary member 12 from the bottom wall 34 of the carrier 16 adjacent the bottom cross bar 57. The front leg 60 is a rectangular plate with a width slightly larger that the width of the tape 58 and that extends approximately to the circumference of the circle or semi-circle of the stationary member 12. As described in more detail below, the front leg 60 is used to make the template 20. An inner guide 62 is connected to a top 66 of the front leg 60 adjacent the tape roller 52. The inner guide 62 has a flat panel 64 with a pair of arms 68 that extend upwardly and at an angle away from the carrier 16 from opposite ends of an inner edge of the flat panel 64. A rotatable wheel 70 extends between each of the arms and the flat panel 64. The rotatable wheels 70 have a distance between them substantially equal to the width of the tape 58. The inner guide 62 functions to direct the tape 58 as the tape 58 extends from the carrier 16. The illustrated front leg 60 also has an outer guide 72 attached to the top 66 of a distal end 75 of the front leg 60. The outer guide 72 has the same configuration and functions in the same manner as the inner guide 62 to direct the tape 58 in a straight line from the carrier 16. In an alternative embodiment, the front leg 60 has a U-shaped cross section, with the tape 58 located within the U-shaped cross section. The front leg 60 of the alternative embodiment only includes a pin at a distal end of the front leg 60 that extends between the two side walls of the U-shaped cross section. The pin is located above the tape 58 and holds the tape 58 within the side walls of the front leg 60.

In the illustrated example, the tape 58 (FIG. 4) has a downwardly projecting portion 81 of an L-shaped end 82 typically found on the tape measure 18. A holder 74 is attached to the downwardly projecting portion 81 of the L-shaped end 82 of the tape 58. The holder 74 is used to securely hold a writing utensil 78, preferably a pencil, erasable marker, or crayon. The holder 74 has an upwardly opening bottom portion 80 that has a U-shaped cross-section and that that receives the downwardly projecting portion 81 of the L-shaped end 82 of the tape 58. The U-shaped bottom portion 80 also have a flange 83 that is secured over a top portion 85 of the L-shaped end 82 of the tape measure 18, thereby securing the holder 74 to the tape measure 18 when the downwardly projecting portion 81 of the L-shaped end 82 is inserted into the U-shaped bottom portion 80. A cylinder 84 is attached to an outside wall of the U-shaped bottom portion 80 that faces away from the carrier 16. The inside diameter of the cylinder 84 is about the same as the outside diameter of the writing utensil 78 in order to frictionally hold the writing utensil 78 therein. Alternatively, the holder 74 only includes a cylinder 84 and is integrally attached to the end of the tape 58.

Figure 5:
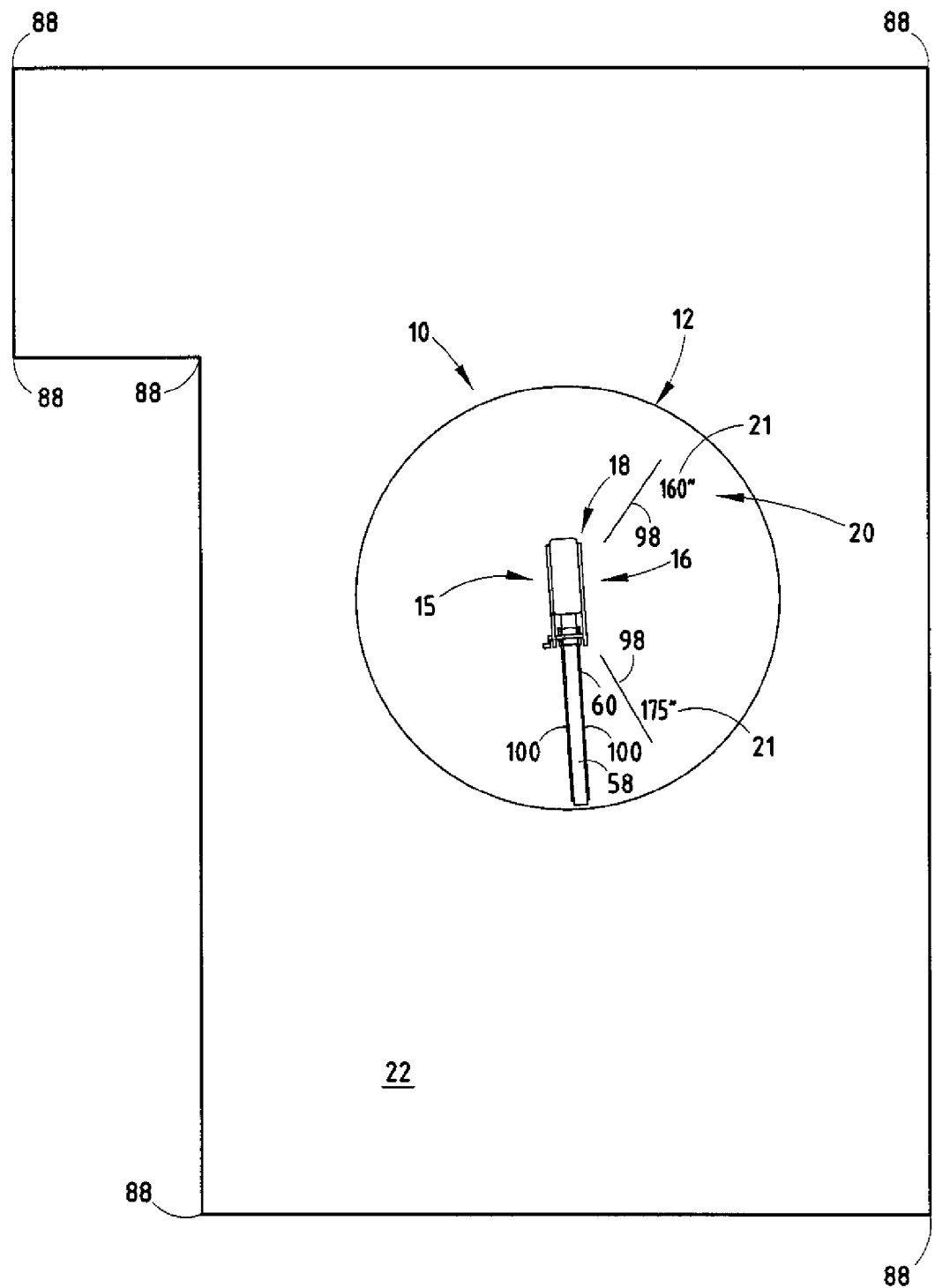
FIG. 5 is a top view of the measuring and layout device with a circular board of the present invention on an area to be measured.

As seen in FIG. 5, the measuring and layout device 10 is used by first choosing the appropriate stationary member 12. The carrier 16 is then snap-fit to the stationary member 12 by the snap-fastener 28. Thereafter, the non-slip feet 14 of the stationary member 12 are attached to the area 22 to be measured, thereby locking the stationary member 12 to the area 22. Preferably, the measuring and layout device 10 is clamped to the area 22 when the area 22 is a table top. Notably, the shape of the stationary member 12 can be other than semi-circular, and the measuring and layout device 10 can be placed anywhere on or near the area 22 to be measured. The area 22 to be measured can be a floor that needs to be carpeted or a counter that needs a top. The area 22 to be measured could also be a wall, and the measuring and layout device 10 can be used for obtaining dimensions of a wall, such as a window opening or the like. The tape measure 18 is then extended to a critical feature 88 on the area 22 to be measured. The critical feature 88 is defined as either a corner of the area 22, a point on an edge of an area 22 where the edge becomes non-linear or anywhere along the edge of an area 22 that is critical for measurement. The distance or dimension 21 from the measuring and layout device 10 to the critical feature 88 is then noted and written on the stationary member 12, thereby creating the template 20. In a preferred embodiment, a paper is placed over the stationary member 12 and around the carrier 16 to record the template 20. In another preferred embodiment, the template 20 is written directly onto the stationary member 12 wherein the stationary member is erasable. The template 20 is prepared by first drawing a line 98 along a straight edge 100 of the front leg 60 of the carrier 16. The distance 21 from the measuring and layout device 10 to the critical feature 88 is then written next to the line 98 on the stationary member 12. In the illustration, the line 98 has been drawn, and the distance 21 (i.e. 175") has been written beside it. The distance 21 is measured from the critical feature 88 to a point on the tape 58, preferably determined by drawing a perpendicular mark on the line 21 aligned with and corresponding to a number on the tape 58 equal to the distance 21. The carrier 16 is then rotated again until the tape measure 18 is aligned with another critical feature 88 of the area 22 to be measured and the distance 21 is again noted and recorded on the template 20 as explained above. Notably, by extending the tape 58 to a second point in the middle or any other edge of the room and then reversing the measuring and layout device 10 end to end, additional measurements can be taken at the new location. This would allow someone to measure around blind corners in a room much like surveyors lay out a plot of land. It is contemplated that two different papers can be used for taking measurements at the two different room locations, or that different color markings can be made with the same paper to make a single template 20 having all of the information for the room with blind corners thereon.

Figure 6:
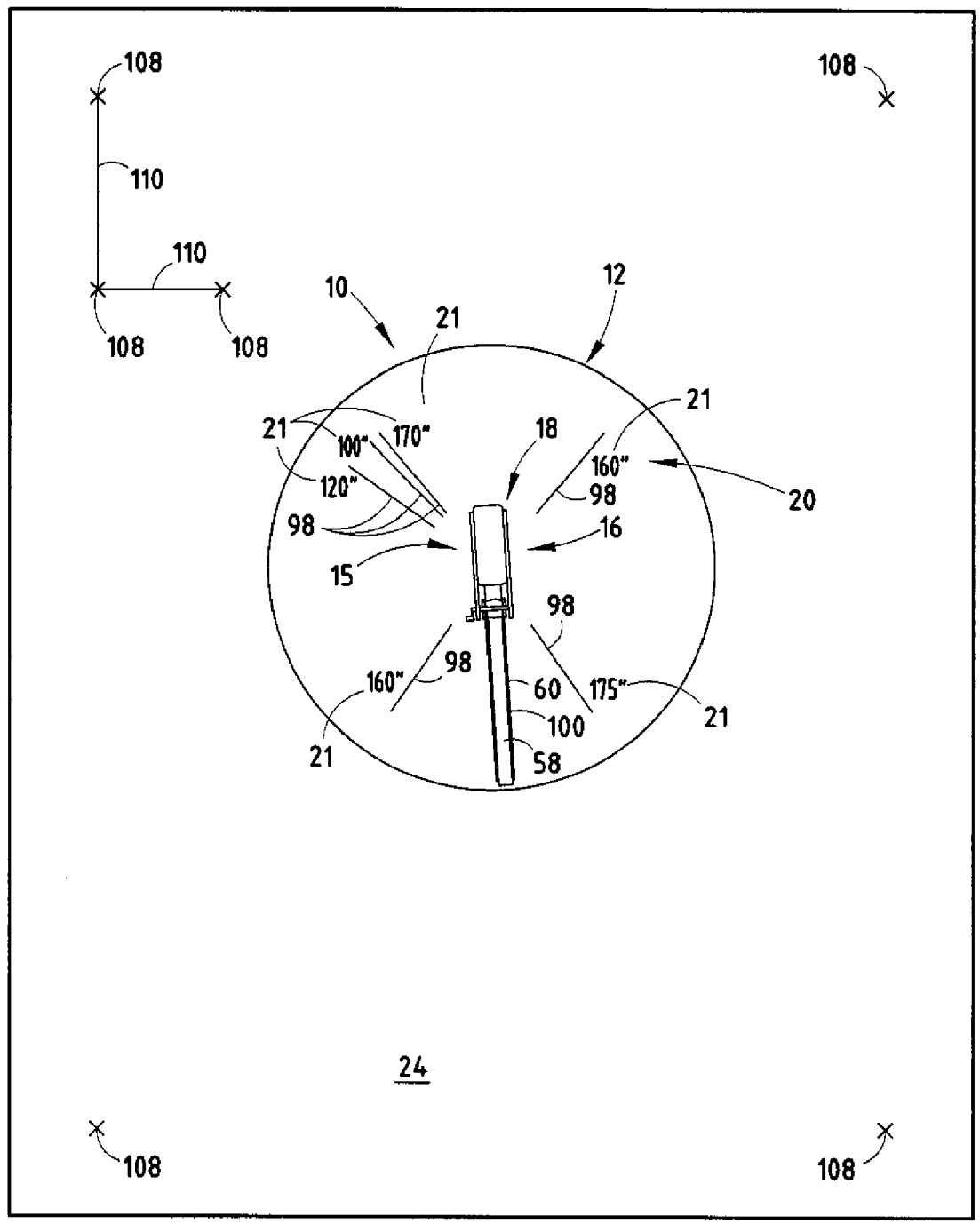
FIG. 6 is a top view of the measuring and layout device with the circular board of the present invention on a sheet good for placement.

As seen in FIG. 6, the measuring and layout device 10 is used to measure sheet goods 24 for placement, and is used by securing the measuring and layout device 10 to the sheet goods 24 by the non-slip feet 14. The measuring and layout device 10 could also be placed near the sheet goods 24, if the stationary member 12 was placed near the area 22 to be measured. If the template 20 was written directly on the stationary member 12, the same stationary member 12 must be used to measure the sheet goods 24. If the paper was placed on the stationary member 12 to make the template 20, the paper can either be placed over another stationary member 12 of another measuring and layout device 10 or over the stationary member 12 of the same measuring and layout device 10. If the paper is used, only the paper has to be transported or faxed between the area 22 to be measured and the sheet goods 24. Once the measuring and layout device 10 is secured to the sheet goods 24, the template 20 is read backwards to draw the configuration of the area 22 to be measured. The template 20 is read backwards by first aligning the straight edge 100 of the front leg 60 with a first one of the lines 98 written to form the template 20. The tape measure 18 is then extended to the distance 21 noted on the template 20 and a distance mark 108 is drawn on the sheet goods 24. The carrier 16 is then rotated until the next line 98 is encountered. Once again, the straight edge 100 of the front leg 60 is aligned with the next line 98 and the tape measure 18 is extended to the distance 21 noted on the template 20 and the distance mark 108 is drawn on the sheet goods 24. After all of the distances 21 noted on the template 20 have been marked on the sheet goods 24, the measuring and layout device 10 is removed from the sheet goods 24 and lines 110 are drawn between the distance marks 108 on the sheet goods 24 that were consecutively drawn on the sheet goods 24. The lines 110 connecting the consecutive distance marks 108 will have the same configuration as the area 22 to be measured. After all of the lines 110 are drawn between the distance marks 108 on the sheet goods 24, the sheet goods 24 are cut along the lines 110 thereby making the sheet good 24 with the same configuration as the area 22 to be measured. The sheet good 24 can then be placed over the area 22 to be measured and secured to the area 22 to be measured to form a cover.

Figure 7:
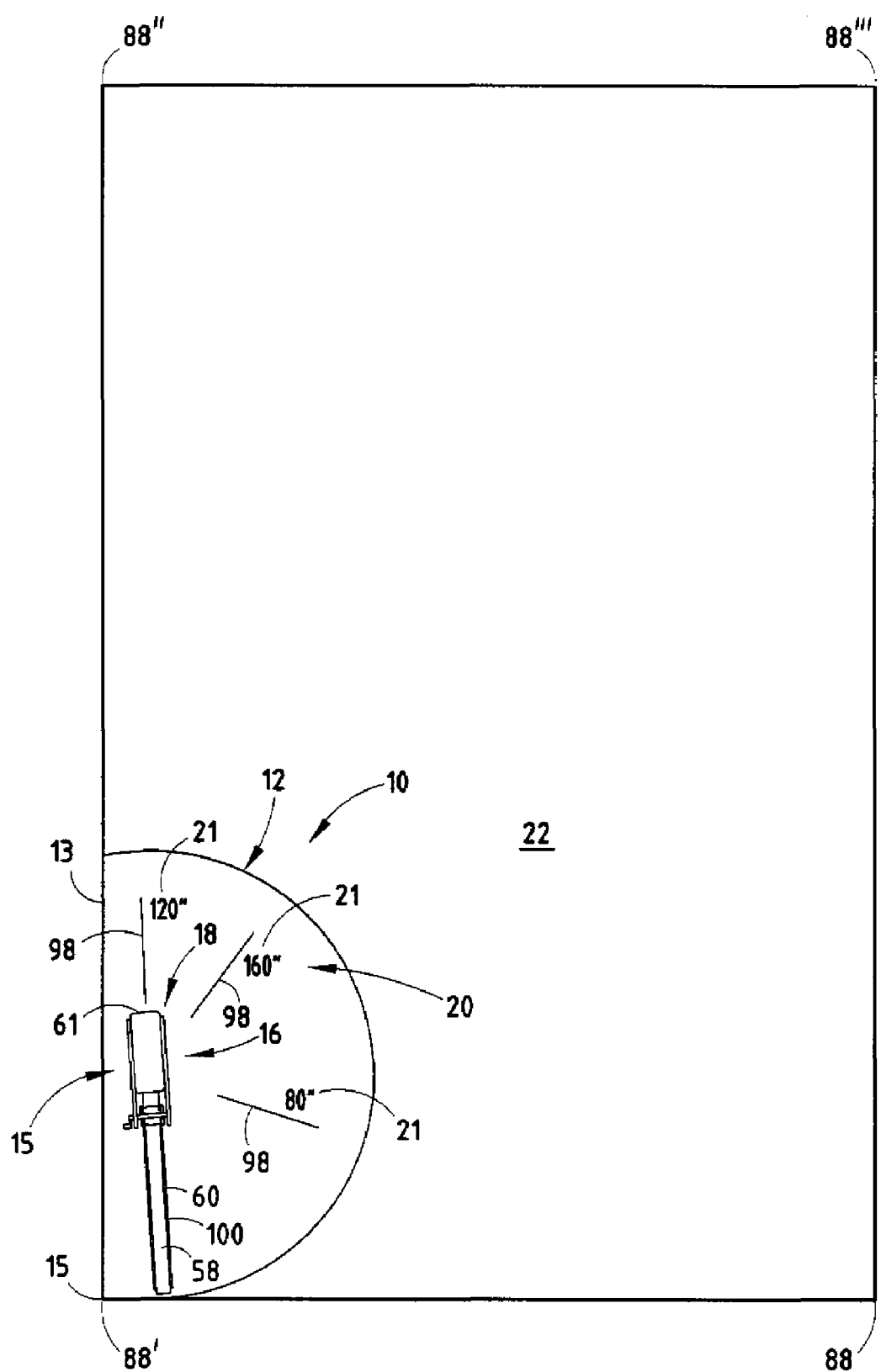
FIG. 7 is a top view of the measuring and layout device with a semi-circular board of the present invention on an area to be measured.

As seen in FIG. 7, if the stationary member 12 with the semi-circular configuration is used to make the template 20, the measuring and layout device 10 is used by first placing the straight edge 13 of the semi-circular stationary member 12 along a first edge 111 of the area 22. The carrier 16 on the semi-circular stationary member 12 is positioned on the stationary member 12 whereby a back end 61 of the carrier 16 or tape measure 18 does not extend beyond the straight edge 13 of the stationary member 12 while the carrier 16 is rotated around the snap fastener 28. Therefore, the template 20 can be made when the straight edge 13 of the stationary member 12 is placed next to a wall along an edge of the area 22 to be measured. The template 20 is created by rotating the carrier 16 to point towards the critical feature 88" along the first edge 111 of the area 22 distal from the stationary member 12. The line 98 is then drawn, and the distance 21 is written beside the line 98. The carrier 16 is then rotated further along the semi-circle until the tape measure 18 is aligned with another critical feature 88'" of the area 22 to be measured and the distance 21 is again noted and recorded on the template 20 as explained above. The template is completed by marking all of the lines 98 and distances 21 of critical features 88 of the area.

Figure 8:
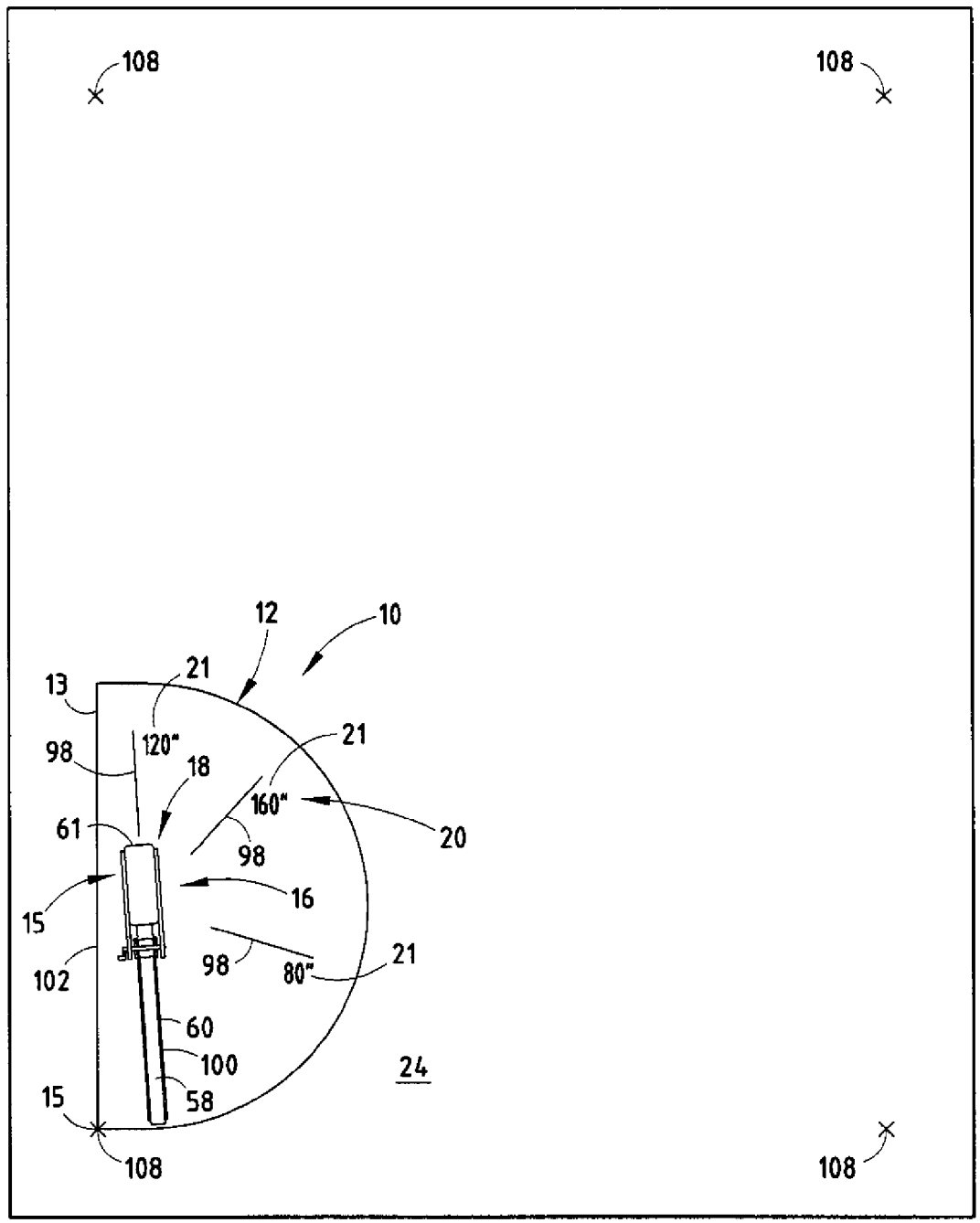
FIG. 8 is a top view of the measuring and layout device with the semi-circular board of the present invention on a sheet good for placement.

As seen in FIG. 8, the measuring and layout device 10 with the semi-circular configuration is used to measure sheet goods 24 for placement by securing the measuring and layout device 10 to the sheet goods 24. A line 102 is then drawn along the straight edge 13 of the semi-circular stationary member 12 to the end 15 of the semi-circle that was aligned with the critical feature 88'. Alternatively, the straight edge 13 is aligned with a pattern or feature on the sheet goods (such as carpet weaving or a straight edge of bulk goods). The distance mark 108 is drawn on the sheet goods 24 at the end 15 of the semi-circle. The template 20 is then read backwards as described above for all of the critical features 88 and the distance marks 108 are drawn on the sheet goods 24. As described above, the measuring and layout device 10 is then removed from the sheet goods 24 and lines 110 are drawn between the distance marks 108 on the sheet goods 24 that were consecutively drawn on the sheet goods 24. The sheet goods 24 are then cut along the lines 110 and placed over the area 22 to be measured and secured to the area 22 to be measured to form a cover. It is contemplated that the method of using the measuring and layout device with the semi-circular stationary member 12 to create a template 20 and measure sheet goods 24 as described directly above could also be used with any stationary member 12.

Figure 9:
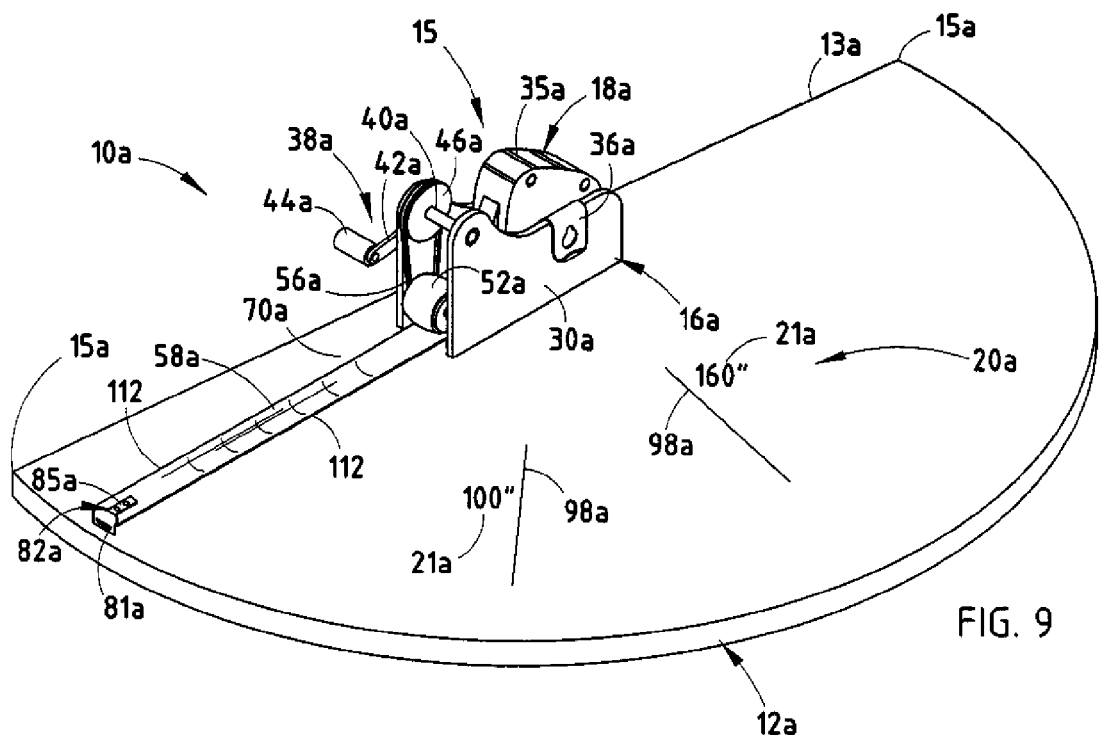
FIG. 9 is a perspective view of a second embodiment of the measuring and layout device of the present invention.

The reference numeral 10a (FIG. 9) generally designates another embodiment of the present invention, having a measuring and layout device. Since measuring and layout device 10a is similar to the previously described measuring and layout device 10, similar parts appearing in FIG. 1 and FIG. 9, respectively, are represented by the same, corresponding reference number, except for the suffix "a" in the numerals of the latter. In the measuring and layout device 10a, the carrier 16a does not include a front leg 60. The tape 58a of the tape measure 18a is resilient and has a pair of well-defined hard edges 112. The first resilient edges 112 of the measuring and layout device 10a take the place of the straight line 100. Therefore, the lines 98a drawn on the template 20a are drawn along the resilient edges 112.

Figure 10:
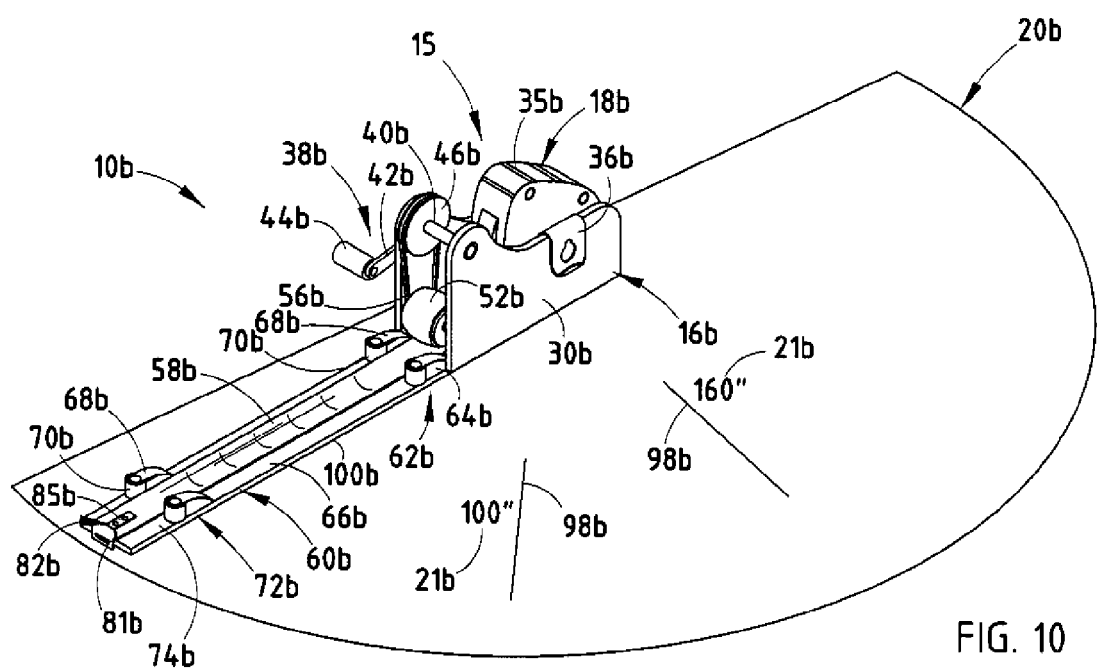
FIG. 10 is a perspective view of a third embodiment of the measuring and layout device of the present invention.

The reference numeral 10b (FIG. 0) generally designates another embodiment of the present invention, having a measuring and layout device. Since measuring and layout device 10b is similar to the previously described measuring and layout device 10, similar parts appearing in FIG. 1 and FIGS. 10, respectively, are represented by the same, corresponding reference number, except for the suffix "b" in the numerals of the latter. The measuring and layout device 10b is not connected to a stationary member 12. Therefore, the carrier 16b is placed directly on the template 20b and rotated under the center of the carrier 16b in order to make the template 20b. The template 20b is therefore preferably written on a piece of paper.

Figure 11:
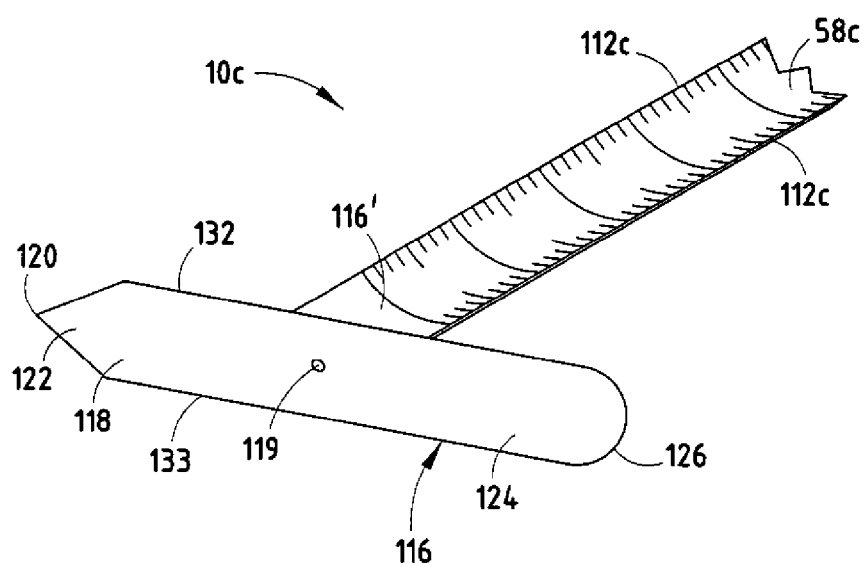
FIG. 11 is an isometric view of the tape with a pivotal pointer of a fourth embodiment of the measuring and layout device of the present invention.

The reference numeral 10c (FIG. 11) generally designates another embodiment of the present invention, having a measuring and layout device. Since measuring and layout device 10c is similar to the previously described measuring and layout device 10, similar parts appearing in FIGS. 4, 7 and 8 and FIGS. 11–13, respectively, are represented by the same, corresponding reference number, except for the suffix "c" in the numerals of the latter. In the measuring and layout device 10c a pivotable pointer 116 is attached to the end of the tape 58c of the tape measure 18c instead of the holder 74. The pivotable pointer 116 is attached to the top of the tape 58a by a pivot 119. The pivotable pointer 116 has a first portion 118 with a point 120 at a distal end 122 and a second portion 124 at a near end 126. The second portion 124 of the pivotable pointer 116 has a width approximately equal to the width of the tape 58c. A piece of white tape 116' or markable surface is placed on tape 58c. When the pointer 116 is pivoted away from an aligned position, its angle is marked on the white tape 116' including a notation, and the same notation is written on template 20c. The template 20c for the measuring and layout device 10c is written on the stationary member 12c as described above.

Figure 12:
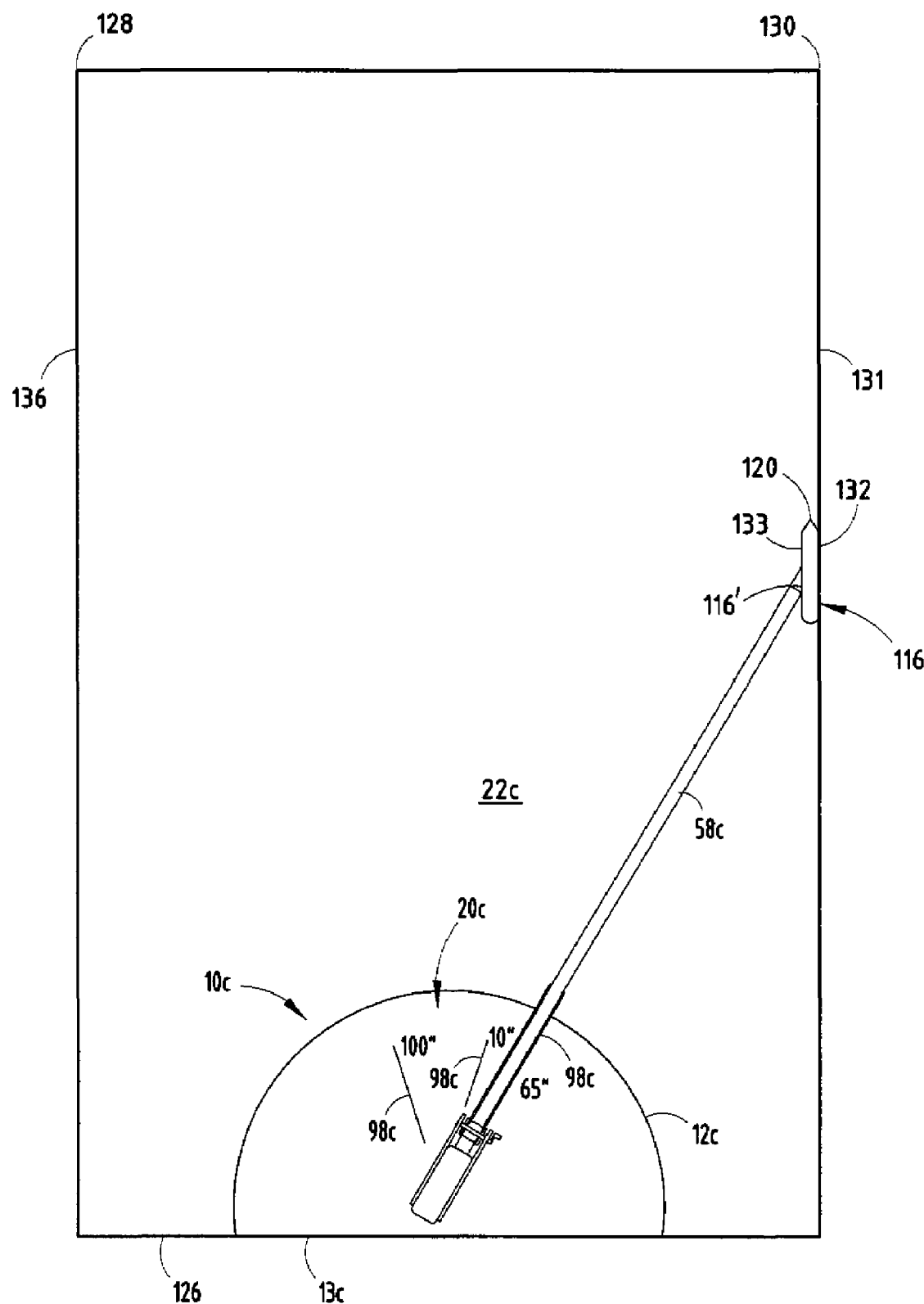
FIG. 12 is a top view of the fourth embodiment of the measuring and layout device of the present invention on an area to be measured.

As seen in FIG. 12, the measuring and layout device 10c is used by first placing the straight edge 13c of the semi-circular stationary member 12c along a first edge 126 of the area 22c. The tape 58c is then extended to a first critical feature 128 of the area 22c, with the point 120 touching the first critical feature 128. When the first critical feature 128 is measured, the second portion 124 of the pivotable pointer 116 is directly above and aligned with the tape 58c. The distance 21c and the line 98c are then written on the template 20c on the stationary member 12c as described above. The tape 58c is then rotated to a second critical feature 130 of the area 22c, with the point 120 touching the second critical feature 128. Once again, the distance 21c and the line 98c is written on the template 20c on the stationary member 12c with the second portion 124 of the pivotable pointer 116 above and aligned with the tape 58c. Thereafter, the tape 58c is rotated to meet a second edge 131 of the area 22a. The pivotable pointer 116 is rotated so that a first straight edge 132 of the pivotable pointer 116 is aligned with the second edge 131. The distance 21c and the line 98c of the blade 58c to the first straight edge 132 are then written on the template 20c on the stationary member 12c as described above. The tape 58c is then finally rotated to meet a third edge 136 of the area 22a. The pivotable pointer 116 is once again rotated so that a second straight edge 133 of the pivotable pointer 116 is aligned with the third edge 136. Furthermore, the distance 21c and the line 98c of the blade 58c to the second straight edge 133 are then written on the template 20c on the stationary member 12c as described above.

Figure 13:
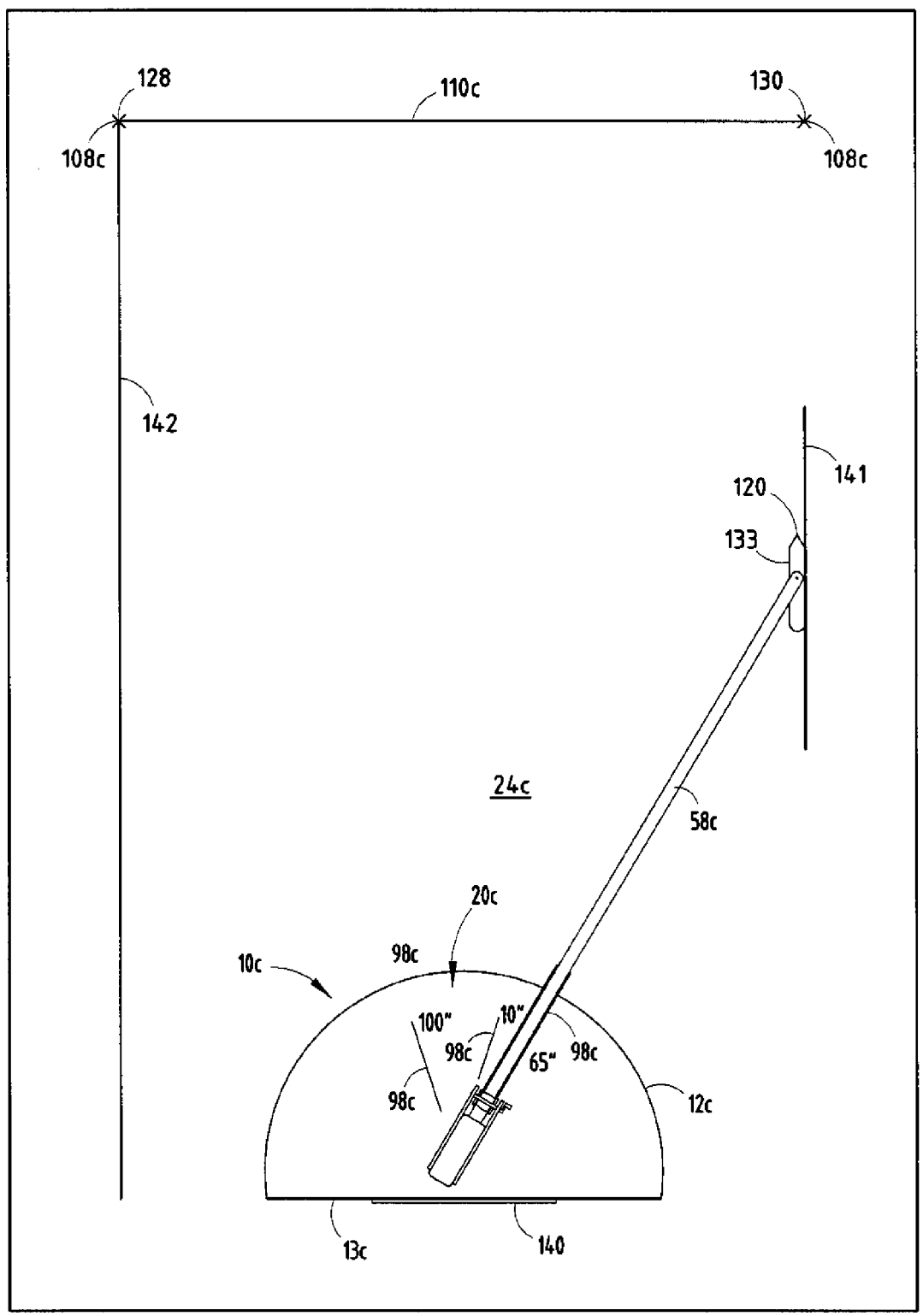
FIG. 13 is a top view of the fourth embodiment of the measuring and layout device of the present invention on a sheet good for placement.

As seen in FIG. 13, the measuring and layout device 10c is used to measure sheet goods 24c by first placing the semi-circular stationary member 12c on the sheet goods 24c. A line 140 is then drawn on the sheet goods 24c along the straight edge 13c. Thereafter, the template 20c is read backwards as described above and distance marks 108c are marked at the first critical feature 128 and the second critical feature 130. The tape 58c is then extended to the distance 21c noted on the template 20c corresponding to the second edge 130 of the area 22c, and a first border line 141 is drawn along the first straight edge 132 of the pivotable pointer 116. The tape 58c is then extended to the distance 21c noted on the template 20c corresponding to the third edge 136 of the area 22c, and a second border line 142 is drawn along the second straight edge 133 of the pivotable pointer 116. The stationary member 12c is then removed from the sheet goods 24c and lines 110c are drawn extending the line 140, the first border line 141 and the second border line 142. A line 110c is also drawn between the distance marks 108c. The interior space of the line 110c, the line 140, the first border line 141 and the second border line 142 will have the same configuration as the area 22 to be measured. The sheet good 24c are then cut as described above, placed over the area 22c to be measured and secured to the area 22c to be measured to form a cover.

The reference numeral 10d (FIG. 14) generally designates another embodiment of the present invention, having a measuring and layout device. Since measuring and layout device 10d is similar to the previously described measuring and layout device 10, similar parts appearing in FIG. 3 and FIG. 14, respectively, are represented by the same, corresponding reference number, except for the suffix "d" in the numerals of the latter. In the measuring and layout device 10d, a battery-operated motor and motor controller 150 replaces the crank arm 42 and the handle 44 of the tape measure extender 38d. The battery-operated motor and motor controller 150 perform the same function as the crank arm 42 and the handle 44 by turning the top cross bar 40d. Alternatively, the battery operated motor and motor controller 150 could be connected to the middle cross bar 48d in order to extend the tape 58d by rotating the tape roller 58d. Therefore, the crank arm 42, the handle 44, the cross bar 40, the first pulley wheel 46, the second pulley wheel 54 and the drive belt 56 could be removed from the measuring and layout device 10d. In another alternative embodiment, the top cross bar 40 or the middle cross bar 48 could be configured with a central opening whereby a drill bit of a drill could be inserted axially into the top cross bar 40 or the middle cross bar 48 through the carrier 16 in order to rotate the top cross bar 40 or the middle cross bar 48. Therefore, the battery-operated motor 150 would include the drill and the drill bit. It is contemplated that the motor and motor controller 150 could be operably connected to pinch rollers 150' for extending and retracting the tape (FIG. 14A).

Figure 15:
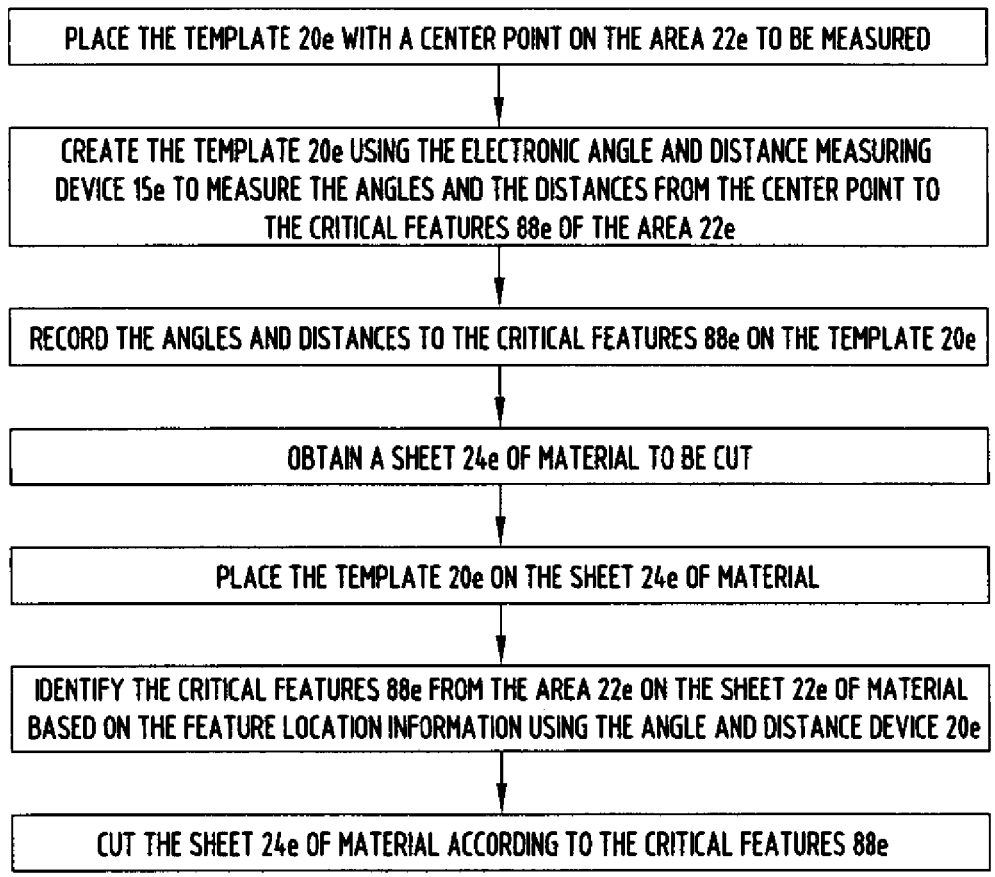
FIG. 15 is a schematic view of a method using a sixth embodiment of the measuring and layout device of the present invention.

FIG. 15 generally designates another embodiment and method of using an electronic measuring and layout device of the present invention. In the electronic measuring and layout device, the angle and distance device 15e is an electronic angle and distance measuring device 15e. The electronic angle and distance measuring device 15e electronically measures feature location information including the angles and distances from a predetermined point to the critical features 88e of the area 22e to be measured. As seen schematically in FIG. 15, the electronic measuring and layout device is used by first placing the template 20e with a center point on the area 22e to be measured. The electronic angle and distance measuring device 15e is then used to create the template 20e by measuring the angles and the distances from the center point to the critical features 88e of the area 22e. The angles and distances to the critical features 88e are then recording on the template 20e. A sheet 24e of material to be cut is then obtained and the template 20e is placed on the sheet 24e of material. The angle and distance device 20e is then provided in order to identify the critical features 88e from the area 22e on the sheet 22e of material based on the feature location information. Finally, the sheet 24e of material is cut according to the critical features 88e.

Figure 16:
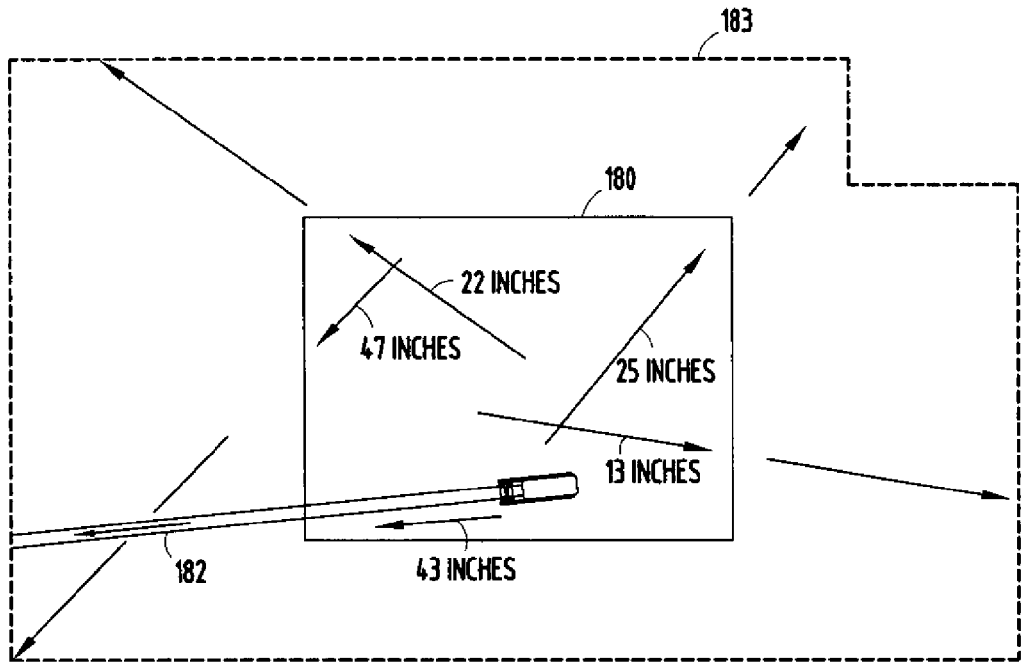
FIG. 16 is a plan view of a template made from an alternative method where a constant pivot is not used.

FIG. 16 discloses a modified method where a tape measure 181 having a longitudinally and laterally rigid tape 182 is placed angularly and randomly on a flat sheet 180. The tape measure 181 is extended and markings are placed on the flat sheet 180. The markings include a line for direction, a mark for distance, and the distance measured for showing a room 183.

Figure 14:
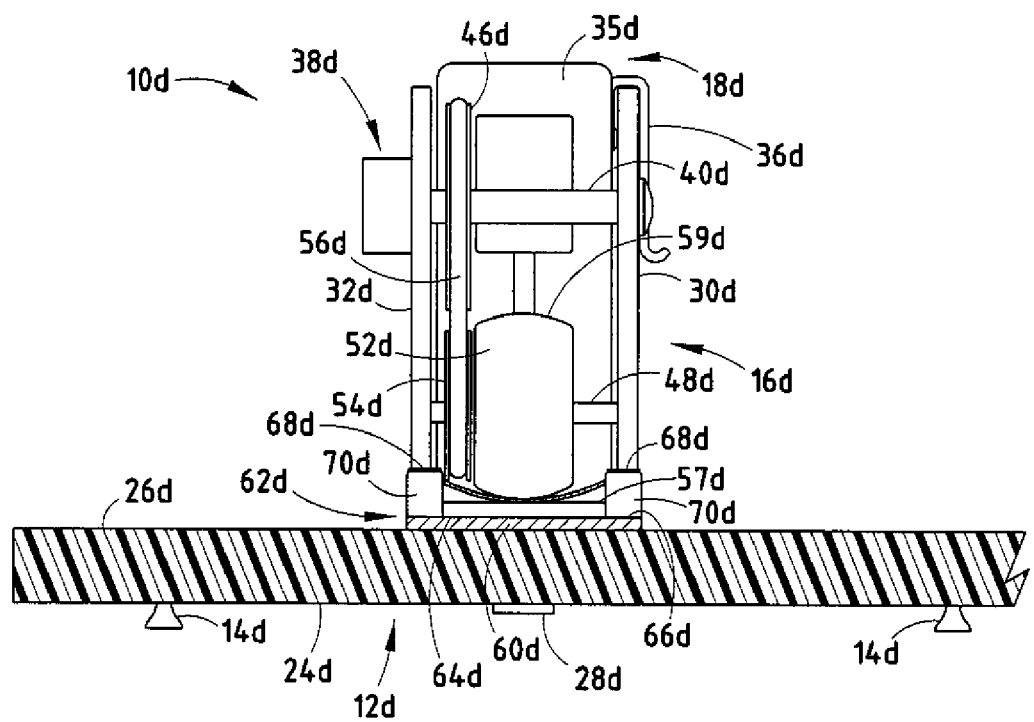
FIG. 14 is a perspective view of a fifth embodiment of the measuring and layout device of the present invention.
Figure 14A:
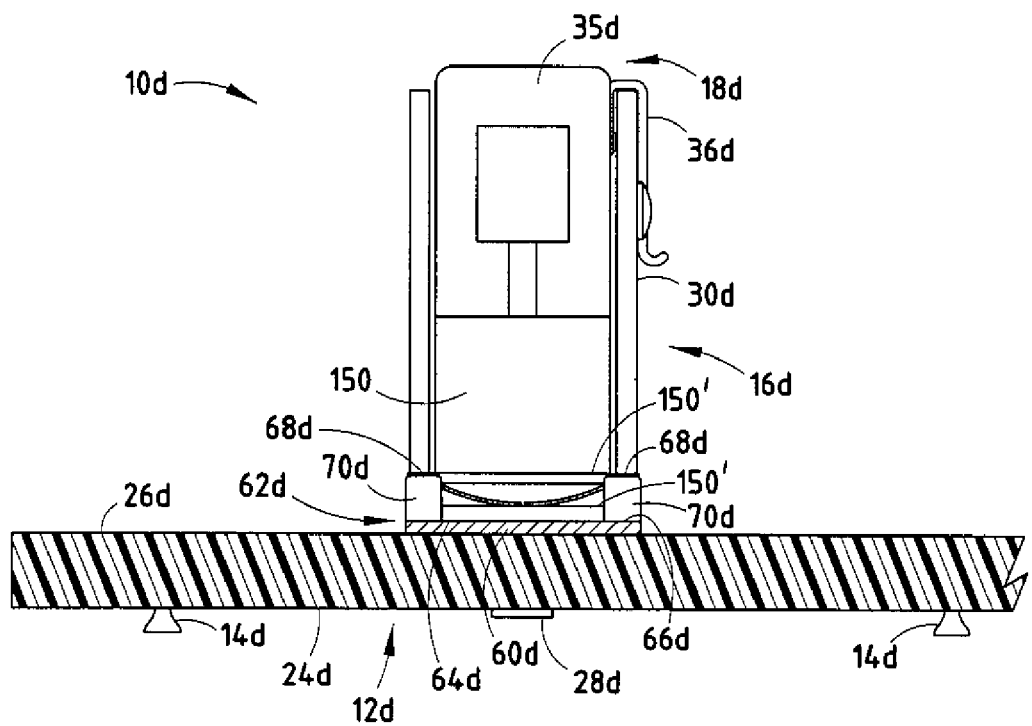
FIG. 14A is a side view of a tape measure including a pinch-roller extender.
Figure 17:
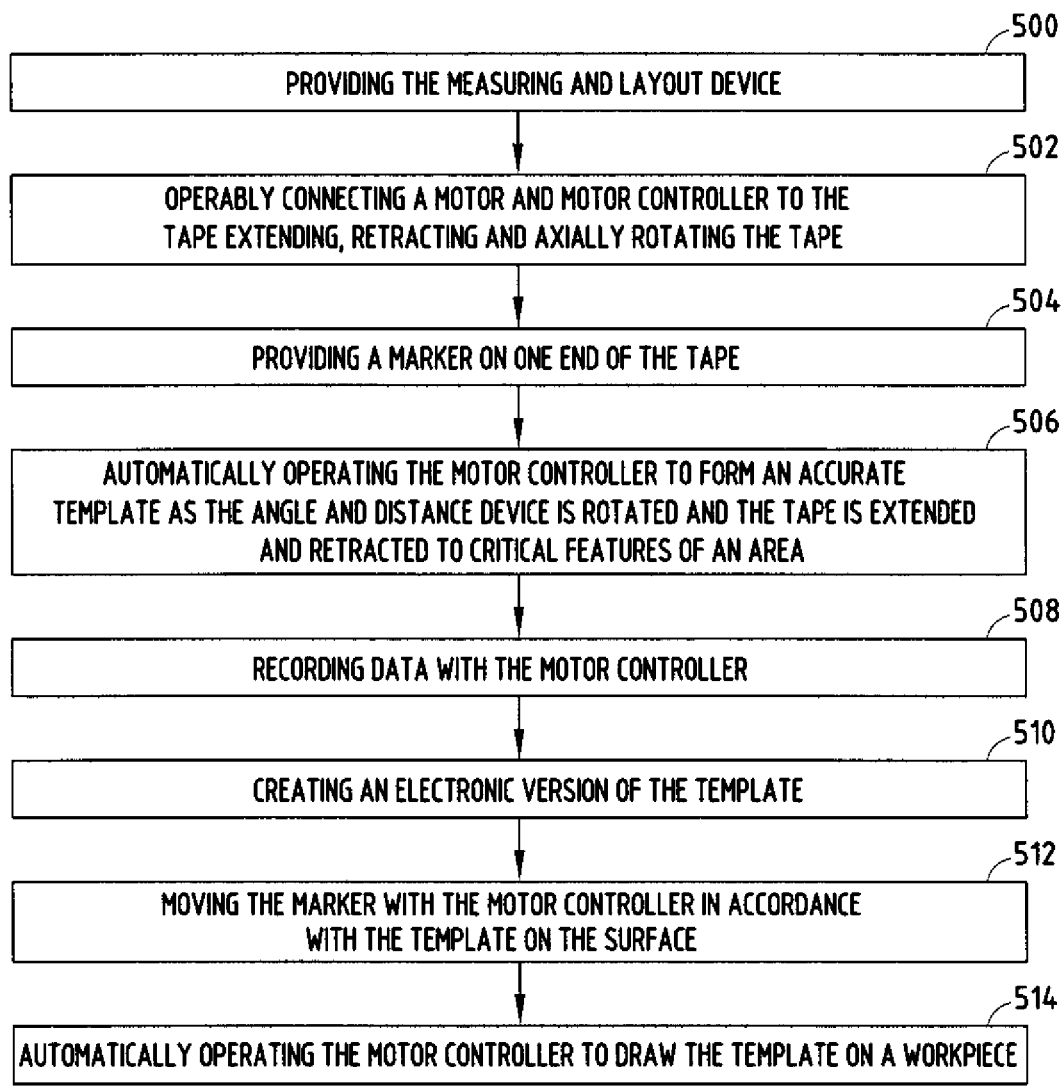
FIG. 17 is a schematic view of a method using the fifth embodiment of the measuring and layout device of the present invention.

FIG. 17 discloses a method of measuring an area and drawing a template on a work piece using the measuring and layout device 10d of FIGS. 14 and 14A. The method includes the step of providing the measuring and layout device at method step 500, wherein the measuring and layout device 10d includes the stationary member 12d having the flat surface 26d adapted to be marked on and the angle and distance device 15d rotatably coupled to the stationary member 12d. The angle and distance device 15d used in this method includes the longitudinally and laterally rigid extendible tape that can be extended from a central point and the edge that facilitates reliably marking on the stationary member to form an accurate template as the angle and distance device 15d is rotated and the tape is extended and retracted to critical features of an area. The method also includes the step of operably connecting a motor and motor controller 150 to the tape for extending, retracting and axially rotating the tape at step 502, wherein the motor controller is programmed to record data and create an electronic version of the template. The method can also include the step of providing a marker on one end of the tape at step 504, with the motor controller being programmed to move the marker in accordance with the template on a surface. The method also includes the step of automatically operating the motor controller to form an accurate template as the angle and distance device 15*d* is rotated and the tape is extended and retracted to critical features of an area at step 506. The method further includes the step of recording data with the motor controller at step 508 and creating an electronic version of the template at step 510, wherein the template comprises a picture. Additionally, the method includes the step of moving the marker with the motor controller in accordance with the template on a surface at step 512 and automatically operating the motor controller to draw the template on a work piece at step 514.

In the forgoing description, it will be readily appreciated by those skilled in the art that modifications may be made to the invention without departing from the concepts disclosed herein. For example, a tape measure extender 38 is not required to use the measuring and layout device 10. The measuring and layout device 10 could be used by one person without the tape measure extender, but the person would have to move from the measuring and layout device 10 to the critical feature and back to the measuring and layout device 10 for each measurement taken. Furthermore, it is understood that the different embodiments of the measuring and layout device 10 can be combined or substituted. For example, the measuring and layout device 10 without a stationary member 12 can also be used without a front leg 60. Also, it is contemplated that a scope of the present invention includes a modified device having a light/laser-based distance measuring device or an optical distance measuring device instead of a tape measure. Also, it is contemplated that the markings on the tape can be optically read or displayed on an LED display, or the markings on a tape can be replaced by a reader that measures extension of the tape and that displays or prints out the extension data. The reader can also potentially be programmed to automatically record angles and dimensions of tape extension to the critical room features at the respective angles. It is known in the art how to manufacture such readouts, optical readers, displayers, printers, and information recorders, such that these items do not need to be described herein for a person of ordinary skill to the present invention. Further, it is noted that the present method will work even without the tape measure being pivoted to the stationary member at a hard pivot. (See FIG. 16). It is contemplated that the template could be a picture as well as an outline, and that the present device can be used to draw the picture or outline. For example, the picture-type template could be a basketball court, a driveway, a hopscotch pattern or a cartoon character. Such modifications are to be considered as included in the following claims, unless these claims by their language expressly state otherwise.

I claim:

1. A measuring and layout device comprising:
   a stationary member having a flat surface adapted to be marked on; and
   an angle and distance device fixedly and rotatably attached to the stationary member, the angle and distance device including a longitudinally and laterally rigid extendable tape that can be extended from a central point and an edge that facilitates reliably marking on the stationary member to form an accurate template as the angle and distance device is rotated and the tape is extended and retracted to critical features of an area;
   wherein the template is formed by markings written directly onto the stationary member; and
   wherein the stationary member has a circular configuration.

2. A measuring and layout device comprising:
   a stationary member having a flat surface adapted to be marked on; and
   an angle and distance device fixedly and rotatably attached to the stationary member, the angle and distance device including a longitudinally and laterally rigid extendable tape that can be extended from a central point and an edge that facilitates reliably marking on the stationary member to form an accurate template as the angle and distance device is rotated and the tape is extended and retracted to critical features of an area;
   wherein the tape has a pivotal pointer at a distal end.

3. A measuring and layout device comprising:
   a stationary member having a flat surface adapted to be marked on; and
   an angle and distance device fixedly and rotatably attached to the stationary member, the angle and distance device including a longitudinally and laterally rigid extendable tape that can be extended from a central point and an edge that facilitates reliably marking on the stationary member to form an accurate template as the angle and distance device is rotated and the tape is extended and retracted to critical features of an area;
   wherein the stationary member has a substantially semicircular configuration.

4. The measuring and layout device of claim 3, wherein the template is formed by markings written onto a paper placed on the stationary member.

5. The measuring and layout device of claim 3, wherein the angle and distance device includes a tape measure extender for mechanically extending the tape, thereby allowing a single person to create the template while staying in a single central location.

6. The measuring and layout device of claim 3, wherein the tape includes an end with a holder attached thereto; and the holder is configured to secure a writing utensil.

7. The measuring and layout device of claim 3, wherein the angle and distance device has a digital readout for accurately communicating a distance that the tape is extended from the angle and distance device.

8. The measuring and layout device of claim 3, wherein the stationary member is a board.

9. The measuring and layout device of claim 8, wherein the board includes non-slip feet.

10. The measuring and layout device of claim 3, wherein the angle and distance device includes a tape measure that incorporates the tape.

11. The measuring and layout device of claim 10, wherein the angle and distance device includes a carrier that is adapted to hold the tape measure.

12. The measuring and layout device of claim 11, wherein the carrier is pivotally coupled to the stationary member.

13. The measuring and layout device of claim 12, wherein:
   the carrier includes a front leg adjacent a top of the stationary member; and the front leg has guides for the tape and a straight edge for making the template.

14. The measuring and layout device of claim 12, wherein the carrier includes an integral housing; and the tape measure is located within the housing.

15. A measuring and layout device comprising:
a stationary member having a flat surface adapted to be marked upon;
a carrier fixedly and rotatably attached to the stationary member; and
an extendable tape connected to the carrier, the tape being configured to be extended from the carrier, the tape including an edge that facilitates reliably marking on the stationary member to form an accurate template as the carrier is rotated and the tape is extended and retracted to critical features of an area;
wherein the carrier includes a tape extender for mechanically extending the tape, thereby allowing a single person to create the template while staying in a single central location; and
wherein the stationary member has a circular configuration.

16. A measuring and layout device comprising:
a stationary member having a flat surface adapted to be marked upon;
a carrier fixedly and rotatably attached to the stationary member; and
an extendable tape connected to the carrier, the tape being configured to be extended from the carrier, the tape including an edge that facilitates reliably marking on the stationary member to form an accurate template as the carrier is rotated and the tape is extended and retracted to critical features of an area;
wherein the carrier includes a tape extender for mechanically extending the tape, thereby allowing a single person to create the template while staying in a single central location; and
wherein the stationary member has a substantially semi-circular configuration.

17. A measuring and layout device comprising:
a stationary member having a flat surface adapted to be marked upon;
a carrier fixedly and rotatably attached to the stationary member; and
an extendable tape connected to the carrier, the tape being configured to be extended from the carrier, the tape including an edge that facilitates reliably marking on the stationary member to form an accurate template as the carrier is rotated and the tape is extended and retracted to critical features of an area;
wherein the carrier includes a tape extender for mechanically extending the tape, thereby allowing a single person to create the template while staying in a single central location; and
wherein the tape has a pivotal pointer at a distal end.

18. A measuring and layout device comprising:
a stationary member having a flat surface adapted to be marked on;
an angle and distance device rotatably attached to the stationary member, the angle and distance device including a longitudinally and laterally rigid extendable tape that can be extended from a central point and an edge that facilitates reliably marking on the stationary member to form an accurate template as the angle and distance device is rotated and the tape is extended and retracted to critical features of an area; and
a motor and motor controller operably connected to the longitudinally and laterally rigid tape for extending, retracting and axially rotating the tape;
the motor controller being programmed to record data and create an electronic version of the template.

19. The measuring and layout device of claim 18, wherein the motor controller is programmed for automatic operation to create the template and to draw the template on a workpiece.

20. The measuring and layout device of claim 18, wherein the tape includes a marker on one end, and the motor controller is programmed to move the marker in accordance with the template on a surface.

21. The measuring and layout device of claim 20, wherein the template comprises a picture.

22. A measuring and layout device comprising:
a stationary member having a flat surface adapted to be marked upon;
a carrier fixedly and rotatably attached to the stationary member; and
an extendable tape connected to the carrier, the tape being configured to be extended from the carrier, the tape including an edge that facilitates reliably marking on the stationary member to form an accurate template as the carrier is rotated and the tape is extended and retracted to critical features of an area;
wherein the carrier includes a tape extender for mechanically extending the tape, thereby allowing a single person to create the template while staying in a single central location;
the carrier includes a front leg adjacent a top of the stationary member;
wherein the front leg has guides for the tape and a straight edge for making the template;
wherein the stationary member is a board; and
wherein the board includes non-slip feet.

23. A method of measuring and laying out a template of a room comprising:
providing a stationary member;
providing a tape measure;
extending the tape measure to a critical feature of an area in a room to be measured; and
recording direction and distance information on the stationary member from the tape measure relating to the critical feature.

24. The method of measuring and laying out a template of claim 23, further comprising:
providing a pointer on an end of the tape measure adapted to be accurately aligned with the critical feature of the area; and
recording the information of the stationary member as the pointer aligns with the critical feature.

25. The method of measuring and laying out of claim 23, wherein the step of recording information on the stationary member includes writing information directly onto the stationary member.

26. The method of measuring and laying out of claim 23, wherein the step of recording information on the stationary member includes writing information onto a paper placed on the stationary member.

27. The method of measuring and laying out of claim 23, wherein the stationary member has a circular configuration.

28. The method of measuring and laying out of claim 23, wherein the stationary member has a substantially semi-circular configuration.

29. The method of measuring and laying out of claim 23, further including:
providing a tape measure extender for mechanically extending the tape measure; and extending the tape measure with the tape measure extender.

30. The method of measuring and laying out of claim 23, further including:
attaching a holder to an end of the tape measure;
wherein the holder is configured to secure a writing utensil to the end of the tape measure.

31. The method of measuring and laying out of claim 23, wherein the tape measure has a digital readout for accurately communicating a distance that the tape measure is extended from the stationary member.

32. The method of measuring and laying out of claim 23, further including connecting a pivotal pointer to a distal end of the tape measure.

33. The method of measuring and laying out of claim 23, wherein the step of recording information on the stationary member includes writing a distance of the tape measure from the stationary member to the critical feature on the stationary member and writing angle information on the stationary member signifying an angle of the tape measure relative to the stationary member.

34. The method of measuring and laying out of claim 23, wherein the stationary member is a board.

35. The method of measuring and laying out of claim 34, wherein the board includes non-slip feet.

36. The method of measuring and laying out of claim 23, further including:
rotatably attaching a carrier to the stationary member; and
connecting the tape measure to the carrier.

37. The method of measuring and laying out of claim 36, wherein:
the carrier includes a front leg adjacent a top of the stationary member;
the front leg has guides for the tape measure and a straight edge; and
the step of recording information on the stationary member including making a mark along the straight edge of the front leg.

38. The method of measuring and laying out of claim 36, wherein the tape measure is located within the carrier.

39. A method of measuring and laying out an area comprising:
providing a stationary member having a flat surface adapted to be marked on;
fixedly and rotatably attaching an angle and distance device to the stationary member, the angle and distance device including a longitudinally and laterally rigid extendable tape that can be extended from a central point and an edge that facilitates reliably marking on the stationary member; and
forming an accurate template by reliably marking on the stationary member as the angle and distance device is rotated and the tape is extended and retracted to critical features of the area.

40. The method of measuring and laying out of claim 39, wherein the angle and distance device includes a tape measure that incorporates the tape.

41. The method of measuring and laying out of claim 39, wherein the stationary member is a board.

42. The method of measuring and laying out of claim 41, wherein:
the board includes non-slip feet.

43. The method of measuring and laying out of claim 39, wherein the step of forming the accurate template includes writing directly onto the stationary member.

44. The method of measuring and laying out of claim 39, wherein the step of forming the accurate template includes writing onto a paper placed on the stationary member.

45. The method of measuring and laying out of claim 39, wherein the stationary member has a circular configuration.

46. The method of measuring and laying out of claim 39, wherein the stationary member has a substantially semi-circular configuration.

47. The method of measuring and laying out of claim 39, further including:
providing the angle and distance device with a tape extender for mechanically extending the tape; and
extending the tape with the tape extender.

48. The method of measuring and laying out of claim 39, further including:
attaching a holder to an end of the tape;
wherein the holder is configured to secure a writing utensil to the end of the tape.

49. The method of measuring and laying out of claim 39, further including providing the angle and distance device with a digital readout for accurately communicating a distance that the tape is extended from the angle and distance device.

50. The method of measuring and laying out of claim 39, further including connecting a pivotal pointer to a distal end of the tape.

51. The method of measuring and laying out of claim 40, further including providing the angle and distance device with a carrier that is adapted to hold the tape measure.

52. The method of measuring and laying out of claim 51, further including pivotally coupling the carrier to the stationary member.

53. The method of measuring and laying out of claim 52, wherein:
the carrier includes a front leg adjacent a top of the stationary member;
the front leg has guides for the tape measure and a straight edge; and
the step of forming a template includes making a mark along the straight edge of the front leg.

54. A method of measuring and laying out an area comprising:
providing a stationary member having a flat surface adapted to be marked on;
rotatably coupling an angle and distance device to the stationary member, the angle and distance device including a longitudinally and laterally rigid extendable tape that can be extended from a central point and an edge that facilitates reliably marking on the stationary member; and
forming an accurate template by reliably marking on the stationary member as the angle and distance device is rotated and the tape is extended and retracted to critical features of the area; wherein
the step of forming an accurate template includes writing a distance of the tape from the stationary member to the critical feature on the stationary member and writing angle information on the stationary member signifying an angle of the tape relative to the stationary member.

* * * * *

UNITED STATES PATENT AND TRADEMARK OFFICE
CERTIFICATE OF CORRECTION

PATENT NO. : 7,062,859 B1 Page 1 of 1
APPLICATION NO. : 09/505119
DATED : June 20, 2006
INVENTOR(S) : Joseph D. Revnell It is certified that error appears in the above-identified patent and that said Letters Patent is hereby corrected as shown below:

Column 8
Line 35, "(Fig. 0)" should be --(Fig. 10)--.

Signed and Sealed this

Seventh Day of November, 2006

JON W. DUDAS
*Director of the United States Patent and Trademark Office*